United States Patent
Jiao

(10) Patent No.: US 12,375,797 B2
(45) Date of Patent: Jul. 29, 2025

(54) METHOD AND DEVICE FOR PROCESSING IMAGE DATA COLLECTED BY TWO CAMERAS

(71) Applicant: Lenovo (Beijing) Limited, Beijing (CN)

(72) Inventor: Yang Jiao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 210 days.

(21) Appl. No.: 18/180,395

(22) Filed: Mar. 8, 2023

(65) Prior Publication Data

US 2023/0328364 A1 Oct. 12, 2023

(30) Foreign Application Priority Data

Mar. 25, 2022 (CN) .......................... 202210305812.1

(51) Int. Cl.
*H04N 23/60* (2023.01)
*H04N 23/667* (2023.01)
*H04N 23/698* (2023.01)
*H04R 3/00* (2006.01)
*H04R 5/027* (2006.01)

(52) U.S. Cl.
CPC ........... *H04N 23/64* (2023.01); *H04N 23/667* (2023.01); *H04N 23/698* (2023.01); *H04R 3/005* (2013.01); *H04R 5/027* (2013.01)

(58) Field of Classification Search
CPC .... H04N 23/64; H04N 23/667; H04N 23/698; H04N 7/181; H04N 23/695; H04N 23/45; H04N 23/951; H04N 23/611; H04N 5/04; H04N 23/60; H04R 3/005; H04R 5/027; H04R 1/406
See application file for complete search history.

(56) References Cited

U.S. PATENT DOCUMENTS

| | | | |
|---|---|---|---|
| 2012/0038776 A1* | 2/2012 | Ahiska ................... | H04N 23/69 348/E7.085 |
| 2019/0387167 A1* | 12/2019 | Adsumilli ............ | H04N 23/611 |
| 2020/0382725 A1* | 12/2020 | Gao ....................... | H04N 23/69 |
| 2021/0344826 A1* | 11/2021 | Wang ..................... | H04N 23/45 |

FOREIGN PATENT DOCUMENTS

| | | |
|---|---|---|
| CN | 112087580 A | 12/2020 |
| CN | 112165590 A | 1/2021 |
| CN | 113473012 A | 10/2021 |

* cited by examiner

*Primary Examiner* — Gevell V Selby
(74) *Attorney, Agent, or Firm* — ANOVA LAW GROUP, PLLC

(57) ABSTRACT

A processing method includes controlling a first camera and a second camera of a camera assembly to collect image data based on a target strategy. The image data includes first image data collected by the first camera and second image data collected by the second camera. The method further includes processing the first image data and the second image data to obtain target image data. A configuration parameter of the first camera and a configuration parameter of the second camera are different from each other.

19 Claims, 10 Drawing Sheets

Control a first camera and a second camera of a camera assembly to collect image data based on a target strategy Process first image data collected by the first camera and second image data collected by the second camera to obtain target image data, configuration parameters of the first camera and the second camera being different

METHOD AND DEVICE FOR PROCESSING IMAGE DATA COLLECTED BY TWO CAMERAS

CROSS-REFERENCE TO RELATED APPLICATION

This application claims priority to Chinese Patent Application No. 202210305812.1, filed on Mar. 25, 2022, the entire content of which is incorporated herein by reference.

TECHNICAL FIELD

The present disclosure relates to the technical field of computers and, more particularly, to a processing method and a processing device.

BACKGROUND

In a current camera assembly, such as a surround view camera assembly, two to four fixed-focal-length cameras are usually used to shoot, and then images collected by each camera are spliced in real time to output an image with an image ratio of 6:1 or 3:1. Affected by computing power of an image splicing processor, generally only processing of 3840*2160@30 fps image data of each camera is supported. Therefore, a vertical resolution of a spliced panoramic image will not be greater than 2160, which causes details (effective pixels) of distant characters or objects to be low. Even with digital zoom, mosaic effect is obvious and the image is blurred after the image is enlarged.

In addition, a fixed-focal-length lens is used in a 180-degree camera assembly, and a fisheye ultra-wide-angle lens or multiple lenses are used to splice a 180-degree image. However, due to computing power of an image processor of the camera assembly and bandwidth limitation of a transmission interface such as USB, it is unable to process higher-resolution image data, so that the distant objects and characters cannot be captured clearly.

SUMMARY

In accordance with the disclosure, there is provided a processing method including controlling a first camera and a second camera of a camera assembly to collect image data based on a target strategy. The image data includes first image data collected by the first camera and second image data collected by the second camera. The method further includes processing the first image data and the second image data to obtain target image data. A configuration parameter of the first camera and a configuration parameter of the second camera are different from each other.

Also in accordance with the disclosure, there is provided a processing device including a processor and a memory storing instructions that, when executed by the processor, cause the processor to control a first camera and a second camera of a camera assembly to collect image data based on a target strategy. The image data includes first image data collected by the first camera and second image data collected by the second camera. The instructions further cause the processor to process the first image data and the second image data to obtain target image data. A configuration parameter of the first camera and a configuration parameter of the second camera are different from each other.

DETAILED DESCRIPTION OF THE EMBODIMENTS

Some embodiments of the present disclosure will be described in detail below in conjunction with the accompanying drawings, but it is not intended to limit the present disclosure.

Various modifications may be made to the embodiments disclosed herein. Accordingly, this specification should not be viewed as a limitation, but only as exemplifications of the embodiments. Those skilled in the art will envision other modifications within the scope and spirit of the present disclosure.

The accompanying drawings, which are incorporated in and constitute a part of this specification, illustrate the embodiments of the present disclosure and, together with the general description of the present disclosure given above and the detailed description of the embodiments given below, serve to explain the principle of the present disclosure.

These and other characteristics of the present disclosure will become obvious from the following description of some forms of the embodiments given as non-limiting examples with reference to the accompanying drawings.

While the present disclosure has been described with reference to some examples, those skilled in the art can certainly implement many other equivalents of the present disclosure, which have the features described in the claims and are therefore all within the scope of protection defined thereby.

The above and other aspects, features, and advantages of the present disclosure will become more obvious in view of the following detailed description when taken in conjunction with the accompanying drawings.

Some embodiments of the present disclosure are hereinafter described with reference to the accompanying drawings. However, the disclosed embodiments are merely examples of the present disclosure, which may be implemented in various ways. Well-known and/or repetitive functions and constructions are not described in detail to avoid obscuring the present disclosure with unnecessary or redundant detail. Therefore, specific structural and functional details disclosed herein are not intended to be limiting, but merely as a basis for the claims and as a representative basis for teaching those skilled in the art to variously employ the present disclosure in virtually any suitable detailed structure.

This specification may use the phrases "in an embodiment," "in another embodiment," "in some embodiments," or "in some other embodiments," which may all refer to one or more of the same or different embodiments according to the present disclosure.

Some embodiments of the present disclosure will be described in detail below with reference to the accompanying drawings.

Figure 1:
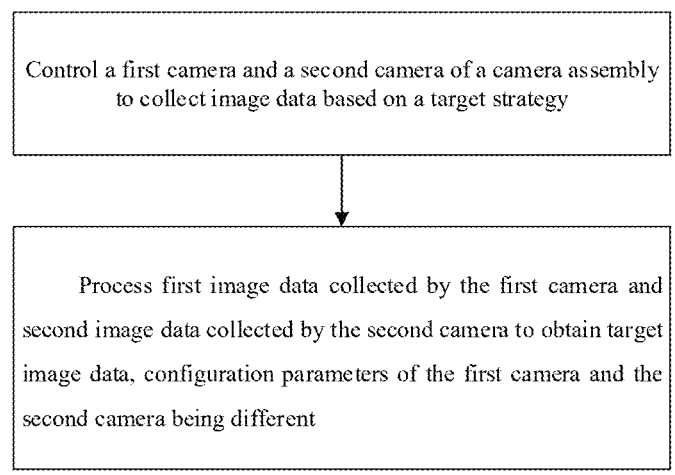
FIG. 1 is a flow chart of a processing method according to an embodiment of the present disclosure.

As shown in FIG. 1, the present disclosure provides a processing method, which includes controlling a first camera and a second camera of a camera assembly to collect image data based on a target strategy, and processing first image data collected by the first camera and second image data collected by the second camera to obtain target image data. Configuration parameters of the first camera and the second camera are different.

The method consistent with the present disclosure can be applied to a camera assembly that includes at least the first camera and the second camera, or to an external device connected to the camera assembly. In the camera assembly, numbers of the first cameras and the second cameras may not be unique, that is, the first camera may refer to a first camera array, and the second camera may refer to a second camera array. The first camera and the second camera have a unified signal reception assembly, so that the first camera and the second camera can receive control instructions synchronously or asynchronously to perform corresponding image collection operations. When the processing method consistent with the present disclosure is implemented, the device will control the first camera and the second camera of the camera assembly to collect image data based on the target strategy. The camera assembly may not only be provided with the first camera and the second camera, but also be provided with another camera. In addition, in the present disclosure, at least the configuration parameters of the first camera and the second camera are different. For example, the two cameras are respectively a long-focal-length camera and a short-focal-length camera, a fixed-focal-length camera and a zoom camera, etc., which are not unique. The camera assembly in the present disclosure has a unified signal reception assembly configured to receive instruction signals and correspondingly realize image collection. The target strategy may be a display strategy of an image that needs to be captured, such as a display strategy determined based on requirements of image display size, resolution, etc. The target strategy may also be a video output strategy, a strategy that combines audio collection and output, etc., such as a strategy specified based on output requirements of a video screen. The output requirements may also involve, but are not limited to, resolution, changes in distance of a target object, etc., which includes first displaying a panoramic area in the video screen and then displaying a close-up of an object, and also includes the audio collection and output, etc. In order to adapt to different target strategies, the device can control the first camera and the second camera to collect synchronously or asynchronously. Collection areas, collection parameters of each camera during collection, etc. may also be the same or different. For example, the first camera and the second camera are controlled to collect different areas respectively to obtain different first image and second image. Or, the first camera is controlled to shoot an area first, and the second camera is then or simultaneously controlled to shoot part of the area, so as to obtain different first image and second image respectively. Or, the two cameras can be separately controlled to shoot synchronously or asynchronously according to other control logics or time conditions, such as start-up time of the cameras. After obtaining the first image and the second image collected by the two cameras, the device can process the first image and the second image. For example, the first image and the second image are spliced to form a whole image which is the target image data. Or, part of an image area of the second image is spliced into the first image. Or, all or part of the first image and the second image are fused with each other to form the target image data. Or, pixels in part of the area in the second image are enhanced, and then the part is fused and spliced into a target area of the first image, such as a target area with the same image content, etc. Or, image color parameters of the second image are changed, and then the second image is fused and spliced into the first image. Or, image color parameters of both images are changed, and then the two images are fused and spliced to form the target image data. Processing manners are not unique or limited to the ones listed above, and can be set according to actual needs.

Based on the disclosure of the above-mentioned embodiments, a beneficial effect of the present disclosure includes that an electronic device can automatically adjust one or more of the first camera and the second camera with different configuration parameters in the same camera assembly to shoot, including simultaneous shooting, asynchronous shooting, etc., according to actual environment, user shooting requirements, picture/video display requirements, etc. Also, processing can be performed based on the captured first image and second image, so as to finally obtain the target image data that at least meets definition requirements, which improves efficiency and convenience of the image collection in the meanwhile.

Further, controlling the first camera and the second camera of the camera assembly to collect image data based on the target strategy includes: obtaining the first image data collected by the camera assembly, the first image data being collected by the first camera; obtaining the second image data in response to the first image data not meeting output requirements, the second image data being collected by the second camera.

Correspondingly, processing the first image data collected by the first camera and the second image data collected by the second camera to obtain the target image data includes using the second image data to process the first image data to obtain the target image data.

The first camera and the second camera in the present disclosure may be single cameras that are arranged independently, or may be groups of array cameras respectively. The first camera is configured to collect the first image data. When the device obtains the first image data collected by the first camera, the first image data can be analyzed and judged to determine whether the first image data meets the output requirements. The output requirements refer to but are not limited to definition requirements of the image, which can be that definition of a part of the area meets the requirements, or that definition of the entire image meets the requirements. The output requirements may also be that a specific target object is included, or content of the collected image includes a target range, etc. The output requirements may also be other output requirements depending on image parameters, image content, obtained user instructions, etc. When the device determines through analysis that the first image data does not meet the output requirements, the device will obtain the second image data that is collected by the second camera. The second image data may be obtained synchronously by the second camera and the first camera, which is fetched by the device from a memory only when the second image is needed, or may be obtained by controlling the second camera to collect when the device determines that the first image data does not meet the output requirements, which are not unique. When the device is processing the first image data and the second image data, in some embodiments, the second image data is used to process the first image data to obtain the target image data. For example, part of the image data in the second image data can be used to replace, splice, superimpose, or fuse with the first image data in certain image area to enhance pixels, etc. The second image may also be directly spliced with the first image. Part of the image content in the second image may also be added to the first image. Processing manners are not unique in actual applications.

In some embodiments, obtaining the second image data in response to the first image data not meeting the output requirements includes: determining the second camera from the camera assembly to collect the second image data through the second camera in response to image parameters of the first image data not meeting target output parameters; or, determining the second camera from the camera assembly to collect the second image data through the second camera in response to image content of the first image data not including the target object; or, determining the second camera from the camera assembly to collect the second image data through the second camera in response to obtaining an instruction for adjusting the image parameters and/or the image content of the first image data.

Figure 3:
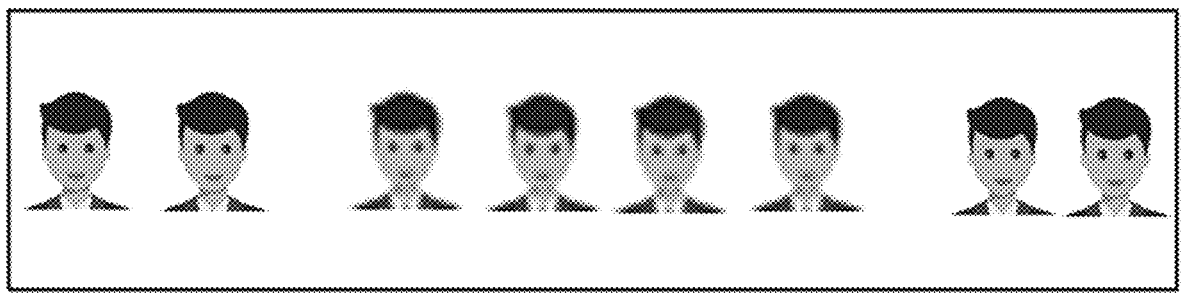
FIG. 3 shows first image data according to an embodiment of the present disclosure.
Figure 5:
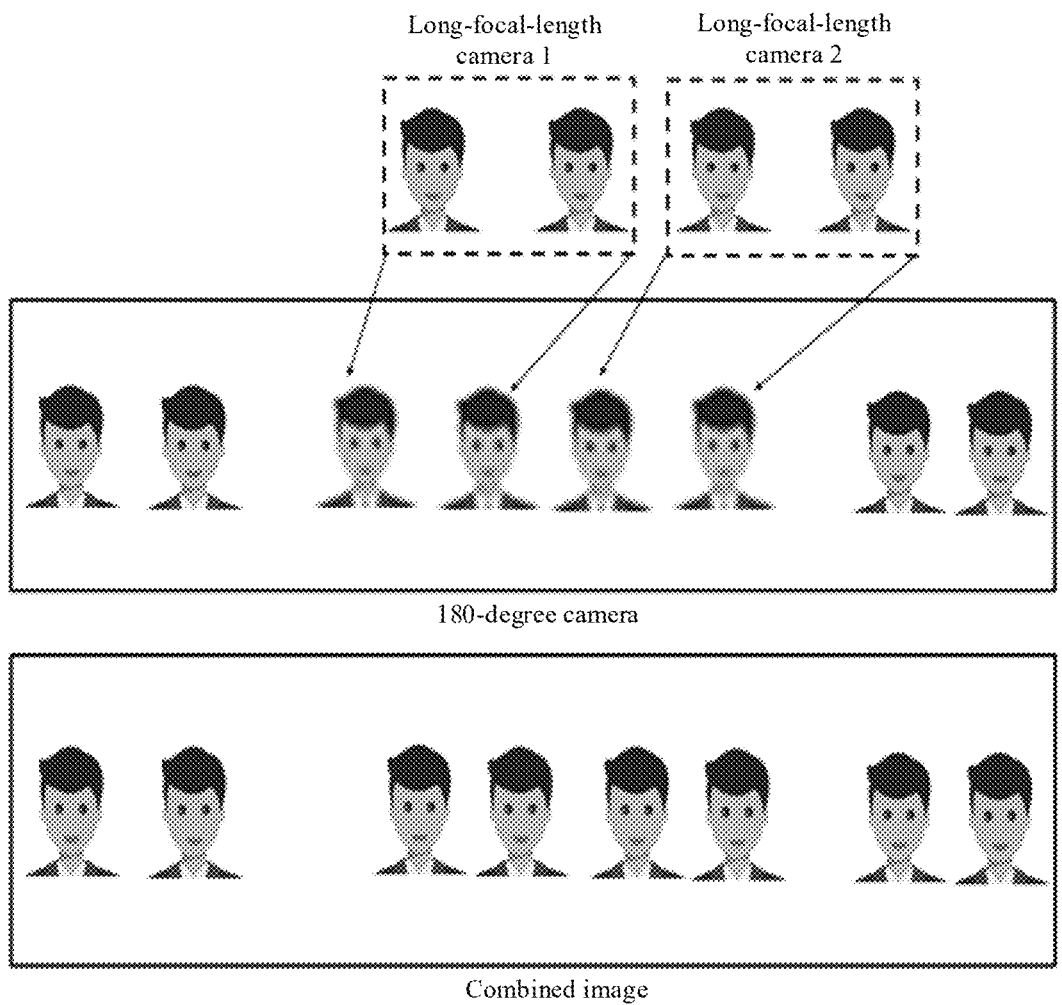
FIG. 5 is a diagram showing a process of forming target image data from second image data and first image data according to an embodiment of the present disclosure.
Figure 7:
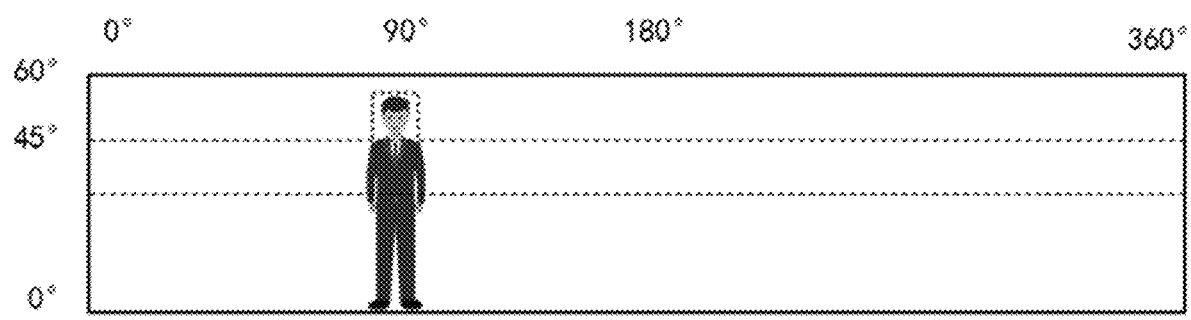
FIG. 7 shows first image data according to another embodiment of the present disclosure.
Figure 8:
FIG. 8 is an enlarged view of a local area of first image data according to another embodiment of the present disclosure.
Figure 9:
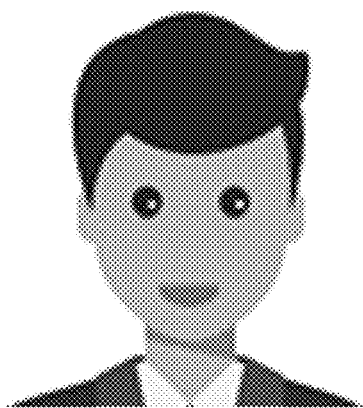
FIG. 9 shows second image data according to another embodiment of the present disclosure.

In an example embodiment, when the device determines that the image parameters of the first image data do not meet the target output parameters through analysis and judgment, the device will respond to that the image parameters of the first image data do not meet the target output parameters, including responding to that definition of all or part of the area does not meet the requirements, and/or resolution of all or part of the first image data does not meet the requirements, and/or color scale of all or part of the first image data does not meet the requirements, and/or blurred area of all or part of the first image data does not meet the requirements, etc. For example, definition and resolution of a character's face in the first image data captured are not high enough, which makes the face appear as a "mosaic" after being enlarged, as shown in FIGS. 3, 7, and 8. Or a character's cloth has obvious color difference, or a size of the captured image content does not meet the requirements, such as that the character is too small and proportions are not coordinated. In this case, the device will determine the second camera from the camera assembly. There may be one or more cameras in the assembly. When there are multiple cameras, the device will select a matching second camera from multiple second cameras to capture the second image, and the second image data is shown in FIGS. 5 and 9 for illustration.

In another example embodiment, when the device determines that the image parameters of the first image data do not meet the target output parameters through analysis and judgment, the device will respond to that the image content of the first image data does not include the target object. For example, the first image data does not include a character object that a user actually wants to shoot, or an environment range collected in the first image data is inconsistent with an environment range that the user actually wants to collect, or the object to be captured is in motion, so that the captured target object has a blur effect, or is deformed, that is, a shooting effect of the target object is not good. In this case, the device will also determine the second camera from the camera assembly. There may be one or more cameras in the assembly. When there are multiple cameras, the device will select a matching second camera from multiple second cameras to capture the second image.

In another example embodiment, when the device determines that the image parameters of the first image data do not meet the target output parameters through analysis and judgment, the device may inform the user of a judgment result, so that the user can inform the device of specific instructions based on own judgment thereof. The instructions may be instructions about the image parameters and/or image content, such as instructions input by the user about low definition, failure to capture the character the user wants to shoot, failure to capture the environment the user wants to shoot, or poor shooting effect of the character and other objects, etc. When the device receives the instructions, it will respond to the instructions of the image parameters and/or image content of the first image data and determine the second camera from the camera assembly. There may be one or more cameras in the assembly. When there are multiple cameras, the device will select a matching second camera from multiple second cameras to capture the second image.

Further, determining the second camera from the camera assembly to collect the second image data through the second camera includes: obtaining the configuration parameters of each camera of the camera assembly, and determining the second camera with target configuration parameters from the camera assembly based on the configuration parameters, so as to collect the second image data that at least partially meets the target output parameters and/or at least includes the target object; or, obtaining change information of a spatial environment where the camera assembly is located, and determining the second camera that matches the change information from the camera assembly, so as to collect the second image data that can include the change information; or, obtaining target output requirements, and determining the second camera from the camera assembly based on the target output requirements, so as to collect the second image data that at least partially meets the target output requirements.

Figure 2:
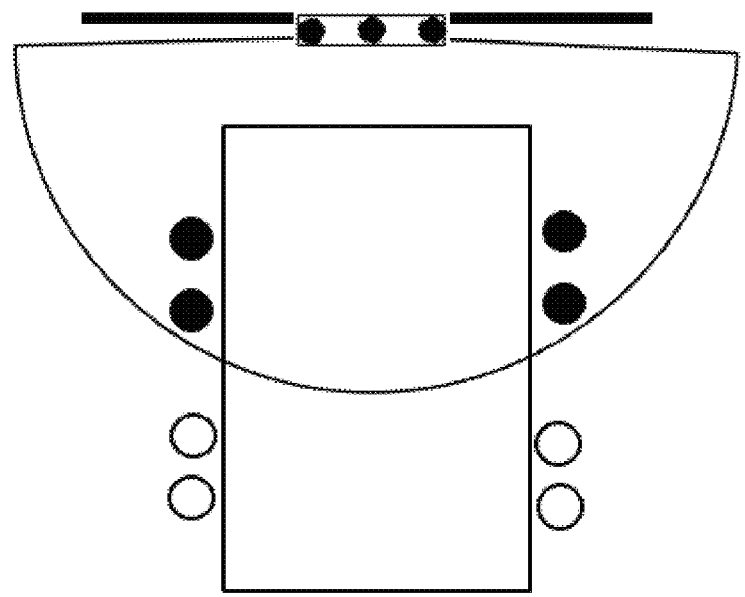
FIG. 2 is a shooting state diagram of a first camera according to an embodiment of the present disclosure.
Figure 4:
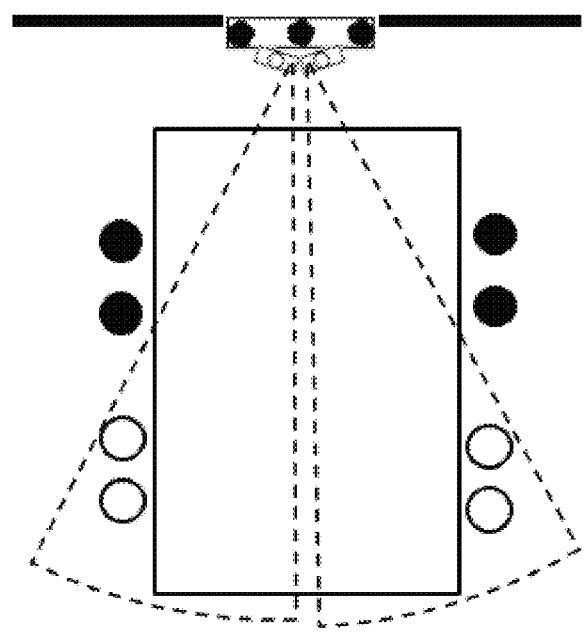
FIG. 4 is a shooting state diagram of second first camera according to an embodiment of the present disclosure.
Figure 6:
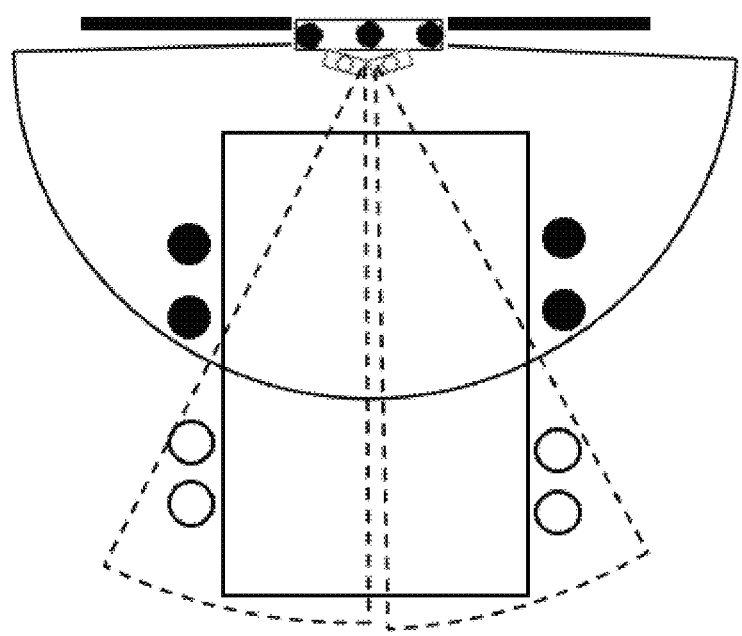
FIG. 6 is diagram showing a scene in which a first camera and a second camera are shooting at the same time according to an embodiment of the present disclosure.

In an example embodiment, the configuration parameters of each camera of the camera assembly can be obtained. For example, the configuration parameters may be viewing angle range and focal length of the camera, such as long focal length, short focal length, fixed focal length, zoom, etc., and may also be sampling rate, frame rate, lens type, etc., such as aperture classification, light sensitivity (illuminance), etc., which are not unique. The configuration parameters may also be based on setting characteristics of the camera, such as whether the camera is a rotatable and movable structure so that the camera can rotate, move, etc. The device may determine the second camera with the target configuration parameters from the camera assembly based on factors such as the configuration parameters of the camera and the setting characteristics of the structure. For example, as shown in FIGS. 3 and 7 again, in the first image data, there are some areas in which the definition of shooting content is insufficient, for example the definition of the character's face is insufficient, or the first camera is a short-focal-length camera, as shown in FIG. 2, which can only shoot close-up scenes, and cannot shoot distant scenes. In this case, the device can select the second camera with higher resolution, higher frame rate, and long-focal-length to shoot the character or the character's face based on the configuration parameters of each second camera, so as to obtain the second image. FIG. 4 shows an example shooting state. After that the device can use the second image to process the areas in the first image where the requirements are not met, so that the target image data that meets the output requirements in all parts of the image data can be obtained, which is shown in FIG. 5 for illustration. Also, in actual applications, there may be multiple second cameras. When shooting the second image, different second cameras can be controlled according to orientations of actual shooting areas, which is shown in FIG. 6 for illustration. As another example, the first image data does not contain the object such as a scene or character that the user wants to capture, which may due to that a shooting range of the first camera is small. In this case, the device may select the second camera with a larger shooting range, i.e., a larger viewing angle range, to capture the second image data. The device may also select the second camera that can change shooting orientation, i.e., can rotate or move, to shoot. For example, the device determines a range to be shot or a position of the object according to the first image data, and then adjusts the movement of the second camera according to orientation information such as the range or position that actually needs to be shot, so that the viewing angle range can correspond to the range or position to be shot, and then the second image data can be obtained by shooting.

In another example embodiment, the device will obtain the change information of the spatial environment where the camera assembly is located. The change information may include a change in shooting spatial environment. For example, only a target character is included in an environment to be shot, but another character enters the environment, or number of objects to be shot is increased, i.e., number of images to be shot is increased. As another example, position of the target character to be shot is changed, or another action occurs, for example the target character was standing when shooting, and then the target character changes to a half-squatting posture, etc. As another example, ambient light is changed. It was sunny and well-lit at first, but then sunlight is blocked by clouds, which causes the ambient light to drop significantly. After the device obtains the above-mentioned change information based on the first image data, the change information may be combined. The device may directly select the second camera from the camera assembly, such as directly selecting a default second camera, or may select the second camera that can overcome environmental problems and overcome problems of spatial environment change to capture the required second image according to the change information. For example, a surround view camera, a camera that can be rotated and pitched in up, down, left, and right directions, or a long-focal-length camera, etc. can be selected, to capture the second image that includes the change information, such as the second image that includes the character who moved position and changed posture, the second image with a wider shooting range, etc.

In another example embodiment, the output requirements are obtained. The output requirements may refer to the output requirements actively input by the user, or may be a suggestion provided by the device to the user based on the content of the first image and then selected and determined by the user, or may be a suggestion directly analyzed and determined by the device based on the content of the first image. For example, the device may determine historical shooting data of the same type or related to current shooting content based on the historical shooting data, and determine current output requirements based on the historical shooting data. As another example, the device may analyze and determine (the device can learn an analysis process in advance) the output requirements of the currently captured image based on application programs currently running on the device and a usage scene of the captured image. The output requirements may include, but not limited to, requirements such as resolution of the image, size of the image, depth of field of the image, whether a specific object is included or not, etc. When the device obtains the output requirements, the device will respond to the requirements to determine the second camera from the camera assembly based on the target output requirements, so as to collect the second image data that at least partially meets the target output requirements. When the second camera is selected and determined, one or more of the foregoing embodiments may be combined for comprehensive determination.

As shown in figures, controlling the first camera and the second camera of the camera assembly to collect image data based on the target strategy includes: obtaining a purpose of the target image data, and controlling the first camera and the second camera of the camera assembly to collect image data synchronously or asynchronously based on the purpose; or, determining the spatial environment where the camera assembly is located, and controlling the first camera and the second camera of the camera assembly to collect image data synchronously or asynchronously based on the spatial environment and/or change information of the spatial environment; or, obtaining operation information of the electronic device, and controlling the first camera and the second camera of the camera assembly to collect image data synchronously or asynchronously based on the operation information.

In an example embodiment, the purpose of the target image data is obtained. The purpose may be notified by the user, or may be determined by the device based on similar historical shooting data, currently used application programs, etc. as described above. The purpose described herein includes but is not limited to product demonstrations, images for speeches, meeting materials for video conferences, monitoring records, photography exhibitions, etc., such as taking pictures and recording participation of all participants in a meeting place during a meeting. In actual applications, the device can provide multiple types of purposes for the user to choose. Corresponding to different purposes, the device can be pre-stored, or pre-trained and learned to form multiple corresponding shooting strategies. For example, for different purposes, shooting parameters, viewing angle ranges, selection of the cameras, shooting sequence of different cameras, etc. corresponding to the shooting strategies are different. The device can automatically determine the matching target strategy according to the purpose, and then control the first camera and the second camera of the camera assembly to collect image data synchronously or asynchronously based on the target strategy.

In another example embodiment, the spatial environment where the camera assembly is located is determined, so as to determine the spatial environment and/or change information of the spatial environment based on the spatial environment. For example, a usage mode or usage scenario of the camera assembly can be inferred according to the spatial environment where the current device is located, and then a usage mode of the camera can be determined based on the usage scenario. If the first image data collected by the first camera determines that a space scene is outdoors or indoors, and lighting conditions are good, in this case, the device can correspondingly determine whether to control the two cameras to collect images synchronously or asynchronously based on the outdoor space scene and the bright indoor scene. Or, the device determines the change information of the spatial environment where the device is located based on the shooting of the first camera within a period of time, such as 5s, 8s, etc. The change information may be object change information, position change information, changes in environmental parameters (including brightness, noise, etc.), etc. For example, the space scene where the device is located is indoors, and the captured images are all participants. However, during a collection process of the first image, there are changes in the participants. For example, there are some new participants, positions of the participants are changed, there are new people sitting in empty seats, or there were no participants sitting in distant seats, but now there are many participants seated. Or, there is a change in meeting place, such as increased indoor space, more seats, etc. Or, there is a change in brightness of the ambient light, noise, etc. The device may control the first camera and the second camera to collect images synchronously or asynchronously based on the change information.

In another example embodiment, the operation information of the electronic device is obtained. The operation information may be application information currently running on the device, operation mode information of the device, operation change information, etc. For example, the currently running application is a conference application, Weibo, or a chat application. A current operation mode of the device is a high-efficiency operation mode, a low-efficiency operation mode, a high-power operation mode switched from a low-power operation mode, a low-power operation mode switched from a high-power operation mode, etc. The device can control the first camera and the second camera of the camera assembly to collect image data synchronously or asynchronously based on the obtained device operation information.

In some embodiments, controlling the first camera and the second camera of the camera assembly to collect image data synchronously or asynchronously based on the change information of the spatial environment includes: if the change information indicates that a first object is in a changing state, controlling the first camera and the second camera to collect image data synchronously; and/or, if the change information indicates that the first object changes from a first state to a second state, controlling the first camera and the second camera to collect image data asynchronously. Or, controlling the first camera and the second camera of the camera assembly to collect image data synchronously or asynchronously based on the operation information includes: if the electronic device runs a first application and/or enters a first operation mode, controlling the first camera and the second camera to collect image data synchronously; or, if the electronic device runs a second application and/or enters a second operation mode, controlling the first camera and the second camera to collect image data asynchronously.

For example, when controlling the two cameras of the camera assembly to capture images based on the change information of the spatial environment, the change information indicates that the first object is in a changing state. In an example of participation in a meeting, the first object may be content displayed on a screen, such as slides, etc., or may be content written by a meeting host on a display board. In this case, since the first object is in a changing state, i.e., it changes from time to time, the device will control the first camera and the second camera to shoot asynchronously. In another example, for product display, such as display of a mobile phone, when the mobile phone is placed on a rotating platform for 3600 display, since the mobile phone (which is the first object) is in a changing state, the device can also control the first camera and the second camera to shoot asynchronously in this case. Specific scenes are not unique, and the above-mentioned examples are only used for illustration. In addition, because the content on the screen, projection, or display board is shot, in order to ensure image output requirements such as definition, collection requirements, etc., the device can choose a long-focal-length camera, a zoom camera, or a long-focal-length camera or a zoom camera with a moving/rotating function, so as to meet various collection requirements of the first object.

Further, the change information determined by the device indicates that the first object changes from the first state to the second state. For example, the first object is an exhibit that can change state, such as a notebook computer. The first state is a folded state, and the second state is an unfolded state; or the first state is a tablet computer, and the second state is a laptop state. For this type of scene, in order to collect images of different states of the first object, the device can control the first camera and the second camera shoots asynchronously.

In addition, the device may also obtain specific change information of the spatial environment. In an example of participation in a meeting, a meeting room may change from small to large, new participants may be seated in the empty seats in the meeting room, a first half of the meeting room may be filled with participants, and then the participants who enter the meeting room later may sit in a second half of the meeting room, that is, the participants first sit close to the camera, and then sit far away from the camera, some participants may change positions, light in the meeting room may change, which may easily cause exposure in some areas during shooting, etc. When the device determines that the change information is the above information, the device may first control the first camera of the camera assembly to collect, and then control the second camera to collect image data. In a scenario where the first half of the meeting room is filled with participants, and then the participants who enter the meeting room later sit in the second half of the meeting room, that is, the participants first sit close to the camera, and then sit far away from the camera, the device may also control the first camera and the second camera of the camera assembly to collect image data synchronously. In addition, in a case where there are multiple second cameras, when the device controls the second camera to collect data, the second camera that is actually responsible for collecting the second image data can be determined according to the aforementioned method. For example, the first camera is a short-focal-length and a wide-angle camera, which can collect panoramic images of the meeting room, but the definition of each area in the image cannot be guaranteed. As shown in FIGS. 4 and 5, the definition can be guaranteed for areas with a short distance, but for areas with a long distance, the definition of shooting is not enough to meet the output requirements. In this case, as shown in FIGS. 4-6, the device may select one or more long-focal-length second cameras with different shooting orientations according to actual areas that need to be shot to shoot scenes in far areas (the long-focal-length camera is better for distant shots, especially for close-up shots of a shooting object). The device may also select the second camera with adjustable shooting orientation to shoot, and the shooting orientation of the second camera can be adjusted according to actual shooting position during shooting, so as to shoot the second image data. For example, as shown in FIG. 5, or FIGS. 7-9, when shooting a distant scene, the long-focal-length camera can be used to take a close-up of a certain object, or a certain number of objects, so as to obtain the second image data with definition meeting the output requirements. After that, the device can process unclear areas in the first image data based on the second image data to obtain the target image data. Moreover, the long-focal-length camera and zoom camera in the second cameras can also be used to switch close-up of the target object. For example, when the first image data is shot, the first object is mainly shot. However, when the second image data is shot, the device can switch the shooting object based on user's instruction, and control the second camera to take a close-up shot of a second object, so that later the device can obtain the target image data including close-up data of two different characters based on two image data.

Further, in some embodiments, the short-focal-length camera and the long-focal-length camera can also be controlled to shoot at the same time. For example, the shooting orientations of multiple second cameras are fixed respectively. In this case, the device can control all cameras to shoot at the same time, and then select a needed second image data from multiple second image data according to the first image data and the above-mentioned change information, and this method is also applicable. Therefore, in general, when the first camera and the second camera are controlled to shoot synchronously or asynchronously, it can be determined according to types of the change information of the spatial environment of shooting. When the type is to add content or reduce content on original basis, the camera can be controlled to shoot asynchronously. For example, when number of participants increases or decreases, the camera can be controlled to shoot asynchronously. When noise in the environment, changes in lighting, etc. are involved without change in an actual object, the cameras can be controlled to shoot synchronously. However, it is needed to pay attention to the shooting orientations of different cameras. For example, when the first camera captures the first image data, influence of light may cause exposure in a certain area. Then the shooting orientation of the second camera that is shooting at the same time needs to be different from the first camera to avoid the light, so that the captured image has no exposure in the above-mentioned exposure area. After that, the device can use the second image data to process the first image data, and the target image data can be finally formed.

Further, in some other embodiments, the device may control the first camera and the second camera of the camera assembly to collect image data synchronously or asynchronously based at least on the application information and operation mode information currently running. For example, when the electronic device is running the first application and/or entering a first running mode, the device may control the first camera and the second camera to collect image data synchronously. In an example of user live broadcast, if the user controls the device to start a live broadcast program and enter a live broadcast mode, the device can control the two cameras to shoot different contents at the same time. Especially when the user is doing live broadcast outdoors, the first camera and the second camera can be controlled to shoot the user and scenes in front of the user respectively, and the two images can be simultaneously displayed on the same display screen. As another example, when the application program currently running on the device is simply shooting, such as simply shooting the panoramic images of the meeting room, the device can control the first camera and the second camera to capture image data synchronously. As another example, when the running application program is video chatting, the device may also control the first camera and the second camera to capture data synchronously.

Further, if the electronic device runs the second application and/or enters the second operation mode, the device may control the first camera and the second camera to collect image data asynchronously. For example, when using an on-demand program of the device, the user can control the two cameras to shoot asynchronously, such as controlling the first camera to shoot before on-demand, and controlling the second camera to shoot after the on-demand, etc. As another example, when the running application program is a wide-angle shooting application program which is for panoramic shooting, the first camera and the second camera may be controlled to shoot asynchronously, such as first controlling the first camera for panoramic shooting, and then controlling the second camera for local area shooting, etc. In addition, when the device is currently in a high-power mode, the current application program may be combined to determine whether shooting of the second camera is synchronous or asynchronous with the first camera. When the device is in a high-power state, the first camera and the second camera may be controlled to shoot asynchronously, such as first shooting based on the first camera, and then controlling the second camera to shoot when it is determined that the second camera needs to be used for shooting. That is, the two types of cameras are controlled to shoot asynchronously based on shooting requirements. In addition, similarly, when the second camera is the long-focal-length camera, the device can still use the long-focal-length camera to perform a close-up of a local scene, or switch a close-up object, which is similar to the description in the above embodiments.

In some embodiments, if a collection area of the second camera partially overlaps with a collection area of the first camera, the first camera or the second camera are controlled to adjust the collection areas based on the configuration parameters of the first camera and the second camera, or, the first image data or the second image data in an overlapping area is deleted based on the configuration parameters of the first camera and the second camera. Or, if there are collection blind spots between the collection area of the second camera and the collection area of the first camera, the first camera or the second camera are controlled to adjust the collection areas based on the configuration parameters of the first camera and the second camera, or, the first image data and the second image data are processed to obtain image data corresponding to the collection blind spots.

For example, when the images are shot synchronously or asynchronously, it is determined based on the shooting requirements that the scenes to be captured by the two cameras are different, such as when the user is doing the live broadcast outdoors. The two cameras need to capture different scenes respectively, where one shoots the user and the other shoots surrounding environment of the user. In this case the shooting areas of the two cameras should not overlap. In this case, if the device finds that the shooting areas of the two cameras overlap, such as the camera for shooting the environment captures the user, the device can adjust the configuration parameters of the first camera and/or the second camera according to the shooting requirements and the collection areas of the cameras, such as adjusting shooting orientation information, so that the collection areas of the two cameras, i.e., the shooting areas do not overlap. Or, the image data pre-collected by the two cameras instead of the shooting orientation information may be adjusted, and overlapping parts in the image data are removed. Then the shooting may be performed again to obtain the image data excluding the overlapping parts.

As another example, if there are collection blind spots in the collection areas of the second camera and the first camera, the configuration parameters of the two cameras may be modified, such as adjusting collection orientations, so that the two cameras can respectively collect images corresponding to the collection blind spots. It may also be that the two cameras can collect images corresponding to each other's collection blind spots after adjustments of the orientations, so that the device can obtain the image data including all scenes based on the collected first image data and second image data. Instead of adjusting the shooting orientations of the two cameras, the first image data and the second image data collected by the two cameras may also be processed, which may include, for example, drawing and rendering the collection blind spots based on pixel changes in a vicinity of the collection blind spots to obtain images corresponding to the collection blind spots, or simulating and filling based on an overall theme atmosphere, background image, background color, etc. of the images to obtain the image corresponding to the collection blind spots.

Further, processing the first image data collected by the first camera and the second image data collected by the second camera to obtain the target image data includes: determining the target output requirements, and performing a first processing on the first image data and the second image data based on the target output requirements to obtain the target image data; or, determining an association relationship between the first image data and the second image data, and performing a second processing on the first image data and the second image data based on the association relationship to obtain the target image data; or, obtaining audio data in the spatial environment where the camera assembly is located, and performing a third processing on the first image data and the second image data based on the audio data to obtain the target image data or target video data including the target image data.

In an example embodiment, a process of processing the image data collected by the first camera and the second camera to obtain the target image data may include determining the target output requirements based on, for example, the running application program on the electronic device, the usage scene, the user instructions, etc. If the target output requirements are determined based on the currently running application program, the application program may be video monitoring. In this case, based on parameter requirements of a video monitoring screen and requirements of image content, the device can determine the target output requirements, which may include resolution of each area of the image, the output requirements of the definition of the image within a monitoring range. After that the device can process the first image data based on the second image data according to the output requirements, including intercepting parts of the second image data to splice and fuse with the corresponding part of the first image data, so as to ensure that the definition of each part of the image meets the requirements. The device may also combine a current application scenario to further determine the target output requirements. In an example of a monitoring program, when the monitoring program is applied to a bank's self-service teller machine, the device can improve parameters on the basis of original configuration parameters of a monitoring screen, such as increasing resolution and definition. Especially for character shooting, definition of a face shooting area is higher. In this case, as shown in FIGS. 7-9, the device can control the second camera to take a close-up of the character, and then capture the close-up content to splice or add to the first image data, etc. The process is similar to the process shown in FIG. 5. In another example, corresponding to a same camera application program, the device may also determine different screen output requirements for outdoors and indoors, and for strong light and non-strong light. For example, the two pieces of image data are taken by the device with different compensation operations. When preparing the target image data, the device can fuse the two images with each other to form the target image data with normal light. After the two images are fused, or after part or all of the two images are spliced, pixel enhancement can also be performed on the processed image to deepen a prominent effect of each object in the image. Image enhancement, i.e., pixel enhancement, may also be performed on part of the data in the first image based on the second image. For example, when shooting one or more characters, the device may perform image enhancement on one or more characters shot in the first image data based on the second image data with stronger definition of the characters as a whole or faces, so that the characters in the target image data are clearer and more prominent.

In another example embodiment, the device determines the association relationship between the first image data and the second image data, and performs the second processing on the first image data and the second image data based on the association relationship to obtain the target image data. For example, the association relationship, i.e., correlation and difference, between the first image and the second image on image contents, such as characters or scenes, or image parameters, such as resolution, definition, exposure intensity, or shooting mode (atmosphere mode) is determined. After that, based on the association relationship and the second image data, the second processing is performed on the first image, such as splicing, pixel enhancement, fusing, etc. For example, image scenes captured by the two cameras are the same, but the configuration parameters of the two cameras are different, such as one for long focal length and one for short focal length, or one for fixed focal length and one for zoom, so although the contents of the images taken by the two cameras are the same, the effects are completely different. Therefore, the device can use the second image to process the first image based on the determined image data output requirements, such as splicing the clearer characters in the second image into the first image, performing the pixel enhancement on the characters in the first image, or fusing a background of the first image based on a background of the second image to obtain the target image data with softer images.

In another example embodiment, the audio data in the spatial environment where the camera assembly is located is obtained, and the third processing on the first image data and the second image data is performed based on the audio data to obtain the target image data or the target video data including the target image data. For example, the audio data may be a voice instruction input by the user, a piece of voice input by the user, or a voice played by another medium in the environment. The device may determine whether there is information about image processing based on received voice instruction, or a piece of voice obtained through voice analysis or semantic analysis, and if so, process the images based on the information. The processing manners also include but are not limited to the aforementioned processing manners in the above embodiments.

In some embodiments, the method consistent with the present disclosure further includes: controlling an audio collection assembly arranged at the camera assembly and/or the electronic device based on the target strategy to collect target audio data, which will be processed into the target video data together with the target image data; or, obtaining positional relationships between each audio collection member of the audio collection assembly arranged at the camera assembly and/or the electronic device and each camera of the camera assembly, and controlling the audio collection assembly to collect the target audio data corresponding to the control strategy of the camera assembly based on the positional relationships.

In an example embodiment, the camera assembly and/or the electronic device is provided with the audio collection assembly for collecting surrounding environmental sounds. The target strategy includes content of simultaneously controlling the audio collection assembly for audio collection. When the device controls the camera assembly to collect images based on the target strategy, the device also controls the audio collection assembly to collect environmental sounds at the same time, so that the collected and processed target image data can be matched with the audio data corresponding to the image data, and the device may process the target video data based on the target image data and the audio data. For example, when to make meeting records, the audio collection assembly can be controlled to collect the audio data in the meeting room while the image content of the meeting room is collected, including speeches of the meeting host and speeches of the participants, so that the device can prepare the video data for recording the meeting based on the collected image data and audio data.

In another example embodiment, the camera assembly and/or the electronic device are provided with the audio collection assembly, and the audio collection assembly includes a plurality of audio collection members. The plurality of the audio collection members may be arranged at different positions of the electronic device, or the cameras of the camera assembly are arranged at different positions of the electronic device, so that the audio collection members thereon can be arranged at different positions of the electronic device. When the device needs to control the collection of the audio data in the environment, the device can determine the audio collection member configured to collect the current environmental sound based on determination of position of a sound source, the currently used camera, or the user's instruction. In addition, when to determine the audio collection member for collection, the audio collection member for audio collection may not correspond to the camera for image collection. For example, the first camera is for image data collection, while the audio collection member at the second camera is for audio data collection, which can be determined by the device according to the position of the sound source. The device may also determine a final collection member for audio collection according to the position of the sound source, whether there are obstacles that block transmission of sound waves in the environment, etc., to ensure that the sound waves are stable and not blocked when collected. The audio collection member and the camera may also be matched with each other and started at the same time, that is, the two members are integrated and need to run synchronously. In this case, the device may determine the audio collection member and the camera that can meet both audio collection and image shooting requirements based on actual environment, so as to ensure that sound collection is qualified and meanwhile, satisfactory image data can be collected, so that the captured content is not blocked, and all required scenes can be collected.

Figure 10:
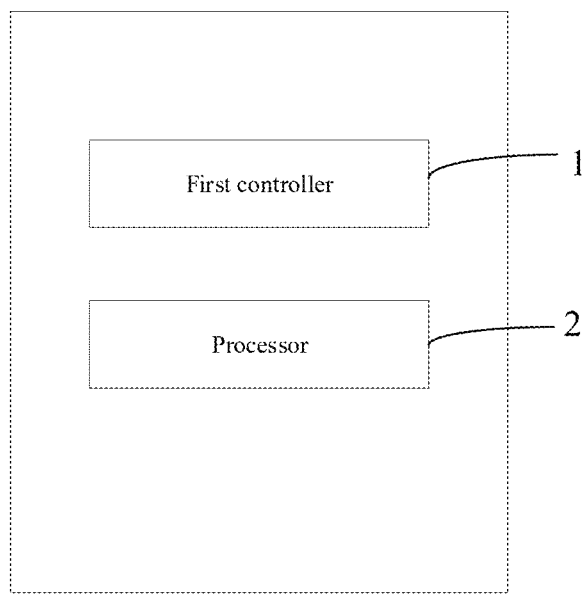
FIG. 10 is a structural block diagram of a processing device according to an embodiment of the present disclosure.

As shown in FIG. 10, the present disclosure provides a processing device at the same time, which includes a first controller 1 and a processor 2. The first controller 1 is configured to control the first camera and the second camera of the camera assembly to collect image data based on the target strategy. The processor 2 is configured to process the first image data collected by the first camera and the second image data collected by the second camera to obtain the target image data. The configuration parameters of the first camera and the second camera are different.

In some embodiments, controlling the first camera and the second camera of the camera assembly to collect image data based on the target strategy includes: obtaining the first image data collected by the camera assembly, the first image data being collected by the first camera; obtaining the second image data in response to the first image data not meeting the output requirements, the second image data being collected by the second camera.

Correspondingly, processing the first image data collected by the first camera and the second image data collected by the second camera to obtain the target image data includes using the second image data to process the first image data to obtain the target image data.

In some embodiments, obtaining the second image data in response to the first image data not meeting the output requirements includes: determining the second camera from the camera assembly to collect the second image data through the second camera in response to the image parameters of the first image data not meeting the target output parameters; or, determining the second camera from the camera assembly to collect the second image data through the second camera in response to the image content of the first image data not including the target object; or, determining the second camera from the camera assembly to collect the second image data through the second camera in response to obtaining the instruction for adjusting the image parameters and/or the image content of the first image data.

In some embodiments, determining the second camera from the camera assembly to collect the second image data through the second camera includes: obtaining the configuration parameters of each camera of the camera assembly, and determining the second camera with the target configuration parameters from the camera assembly based on the configuration parameters, so as to collect the second image data that at least partially meets the target output parameters and/or at least includes the target object; or, obtaining the change information of the spatial environment where the camera assembly is located, and determining the second camera that matches the change information from the camera assembly, so as to collect the second image data that can include the change information; or, obtaining the target output requirements, and determining the second camera from the camera assembly based on the target output requirements, so as to collect the second image data that at least partially meets the target output requirements.

In some embodiments, controlling the first camera and the second camera of the camera assembly to collect image data based on the target strategy includes: obtaining the purpose of the target image data, and controlling the first camera and the second camera of the camera assembly to collect image data synchronously or asynchronously based on the purpose; or, determining the spatial environment where the camera assembly is located, and controlling the first camera and the second camera of the camera assembly to collect image data synchronously or asynchronously based on the spatial environment and/or the change information of the spatial environment; or, obtaining the operation information of the electronic device, and controlling the first camera and the second camera of the camera assembly to collect image data synchronously or asynchronously based on the operation information.

In some embodiments, controlling the first camera and the second camera of the camera assembly to collect image data synchronously or asynchronously based on the change information of the spatial environment includes: if the change information indicates that the first object is in a changing state, controlling the first camera and the second camera to collect image data synchronously; and/or, if the change information indicates that the first object changes from the first state to the second state, controlling the first camera and the second camera to collect image data asynchronously. Or, controlling the first camera and the second camera of the camera assembly to collect image data synchronously or asynchronously based on the operation information includes: if the electronic device runs the first application and/or enters the first operation mode, controlling the first camera and the second camera to collect image data synchronously; or, if the electronic device runs the second application and/or enters the second operation mode, controlling the first camera and the second camera to collect image data asynchronously.

In some embodiments, if the collection area of the second camera partially overlaps with the collection area of the first camera, the first camera or the second camera are controlled to adjust the collection areas based on the configuration parameters of the first camera and the second camera, or, the first image data or the second image data in the overlapping area is deleted based on the configuration parameters of the first camera and the second camera. Or, if there are collection blind spots between the collection area of the second camera and the collection area of the first camera, the first camera or the second camera are controlled to adjust the collection areas based on the configuration parameters of the first camera and the second camera, or, the first image data and the second image data are processed to obtain the image data corresponding to the collection blind spots.

In some embodiments, processing the first image data collected by the first camera and the second image data collected by the second camera to obtain the target image data includes: determining the target output requirements, and performing the first processing on the first image data and the second image data based on the target output requirements to obtain the target image data; or, determining the association relationship between the first image data and the second image data, and performing the second processing on the first image data and the second image data based on the association relationship to obtain the target image data; or, obtaining the audio data in the spatial environment where the camera assembly is located, and performing the third processing on the first image data and the second image data based on the audio data to obtain the target image data or the target video data including the target image data.

In some embodiments, the processing device consistent with the present disclosure further includes a second controller. The second controller is configured to: control the audio collection assembly arranged at the camera assembly and/or the electronic device based on the target strategy to collect the target audio data, which will be processed into the target video data together with the target image data; or, obtain the positional relationships between each audio collection member of the audio collection assembly arranged at the camera assembly and/or the electronic device and each camera of the camera assembly, and control the audio collection assembly to collect the target audio data corresponding to the control strategy of the camera assembly based on the positional relationships.

The present disclosure also provides an electronic device, which includes one or more processors and a memory configured to store one or more programs. When the one or more programs are executed by the one or more processors, the one or more processors are caused to implement the above processing method.

The present disclosure also provides a storage medium, on which a computer program is stored, and when the program is executed by the processor, the above processing method is implemented. The various solutions in the present disclosure have the corresponding technical effects in the method consistent with the present disclosure, which will not be repeated herein.

The present disclosure also provides a computer program product, the computer program product is tangibly stored on a computer readable medium and includes computer executable instructions, which can be read and executed by a computer. The computer executable instructions, when executed, cause at least one processor to perform the processing method consistent with the present disclosure. The various solutions in the present disclosure have the corresponding technical effects in the method consistent with the present disclosure, which will not be repeated herein.

A computer storage medium in the present disclosure may be a computer readable signal medium, a computer readable storage medium, or any combination thereof. The computer readable medium may be, but not limited to, an electrical, magnetic, optical, electromagnetic, infrared, or semiconductor system, apparatus, or device, or any combination thereof. More specific examples of the computer readable storage medium may include, but are not limited to, an electrical connection with one or more wires, a portable computer diskette, a hard disk, a random access storage medium (RAM), a read-only storage medium (ROM), an erasable programmable read-only storage medium (EPROM or flash memory), an optical fiber, a portable compact disk read-only storage medium (CD-ROM), an optical storage medium, a magnetic storage medium, or any suitable combination thereof. In the present disclosure, the computer readable storage medium may be any tangible medium that includes or stores a program that can be used by or in conjunction with an instruction execution system, apparatus, or device. In the present disclosure, the computer readable signal medium may include data signals carrying computer readable program codes and propagating in a baseband or as part of a carrier wave. Such propagated data signals may have many forms, including but not limited to electromagnetic signals, optical signals, or any suitable combination thereof. The computer readable signal medium may also be any computer readable medium other than the computer readable storage medium, and the computer readable medium may send, propagate, or transmit the program configured to be used by or in conjunction with the instruction execution system, apparatus, or device. The program codes embodied on the computer readable medium may be transmitted using any appropriate medium, including but not limited to wireless, antenna, optical cable, radiofrequency (RF), etc., or any suitable combination thereof.

Although the present disclosure is described according to various embodiments, it is not that each embodiment only includes an independent technical solution. The description of the specification is only for clarity, and those skilled in the art should take the specification as a whole. The technical solutions in the various embodiments can also be properly combined to form other embodiments that can be understood by those skilled in the art.

The above embodiments are only exemplary embodiments of the present disclosure, and are not intended to limit the present disclosure. The protection scope of the invention is defined by the claims. Those skilled in the art may make various modifications or equivalent substitutions to the present disclosure within the spirit and scope of the present disclosure, and such modifications or equivalent substitutions shall also be deemed to fall within the scope of the present disclosure.

What is claimed is:

1. A processing method comprising:
controlling a first camera and a second camera of a camera assembly to collect image data based on a target strategy, the image data including first image data collected by the first camera and second image data collected by the second camera, and controlling the first camera and the second camera of the camera assembly to collect the image data based on the target strategy including:
obtaining the first image data collected by the first camera; and
obtaining the second image data collected by the second camera in response to the first image data not meeting an output requirement; and
processing the first image data and the second image data to obtain target image data, including:
processing the first image data using the second image data to obtain the target image data;
wherein a configuration parameter of the first camera and a configuration parameter of the second camera are different from each other.

2. The method of claim 1, wherein obtaining the second image data in response to the first image data not meeting the output requirement includes determining the second camera from the camera assembly to collect the second image data through the second camera in response to at least one of:
an image parameter of the first image data not meeting a target output parameter;
an image content of the first image data not including a target object; or
obtaining an instruction for adjusting at least one of the image parameter or the image content of the first image data.

3. The method of claim 2, wherein determining the second camera from the camera assembly to collect the second image data through the second camera includes at least one of:
obtaining a configuration parameter of each camera of the camera assembly, determining the second camera with a target configuration parameter from the camera assembly based on the configuration parameter of each camera, and collecting the second image data that at least partially meets the target output parameter and/or at least includes the target object;
obtaining change information of a spatial environment where the camera assembly is located, determining the second camera that matches the change information from the camera assembly, and collecting the second image data that includes the change information; or
obtaining a target output requirement, determining the second camera from the camera assembly based on the target output requirement, and collecting the second image data that at least partially meets the target output requirement.

4. The method of claim 1, wherein controlling the first camera and the second camera of the camera assembly to collect the image data based on the target strategy further includes at least one of:
obtaining a purpose of the target image data, and controlling the first camera and the second camera of the camera assembly to collect the image data synchronously or asynchronously based on the purpose;
determining a spatial environment where the camera assembly is located, and controlling the first camera and the second camera of the camera assembly to collect the image data synchronously or asynchronously based on at least one of the spatial environment or change information of the spatial environment; or
obtaining operation information of an electronic device, and controlling the first camera and the second camera of the camera assembly to collect the image data synchronously or asynchronously based on the operation information.

5. The method of claim 4, wherein controlling the first camera and the second camera of the camera assembly to collect the image data synchronously or asynchronously based on the change information of the spatial environment includes at least one of:
in response to the change information indicating that an object is in a changing state, controlling the first camera and the second camera to collect the image data synchronously; or
in response to the change information indicating that the object changes from a first state to a second state, controlling the first camera and the second camera to collect the image data asynchronously.

6. The method of claim 4, wherein controlling the first camera and the second camera of the camera assembly to collect the image data synchronously or asynchronously based on the operation information includes at least one of:
in response to the electronic device running a first application and/or entering a first operation mode, controlling the first camera and the second camera to collect the image data synchronously; or
in response to the electronic device running a second application and/or entering a second operation mode, controlling the first camera and the second camera to collect the image data asynchronously.

7. The method of claim 4, wherein:
in response to a first collection area of the first camera partially overlapping with a second collection area of the second camera:
the first camera is controlled to adjust the first collection area or the second camera is controlled to adjust the second collection area, based on the configuration parameter of the first camera and the configuration parameter of the second camera, or
the first image data or the second image data in an overlapping area is deleted based on the configuration parameter of the first camera and the configuration parameter of the second camera; or
in response to a collection blind spot existing between the first collection area and the second collection area:
the first camera is controlled to adjust the first collection area or the second camera is controlled to adjust the second collection area, based on the configuration parameter of the first camera and the configuration parameter of the second camera, or
the first image data and the second image data are processed to obtain image data corresponding to the collection blind spot.

8. The method of claim 1, wherein processing the first image data and the second image data to obtain the target image data further includes at least one of:
determining a target output requirement, and performing a first processing on the first image data and the second image data based on the target output requirement to obtain the target image data;
determining an association relationship between the first image data and the second image data, and performing a second processing on the first image data and the second image data based on the association relationship to obtain the target image data; or
obtaining audio data in a spatial environment where the camera assembly is located, and performing a third processing on the first image data and the second image data based on the audio data to obtain the target image data or to obtain target video data including the target image data.

9. The method of claim 1, further comprising:
controlling an audio collection assembly arranged at the camera assembly and/or an electronic device based on the target strategy to collect target audio data, and processing the target audio data together with the target image data into target video data; or
obtaining positional relationships between various audio collection members of the audio collection assembly and various cameras of the camera assembly, and controlling the audio collection assembly to collect the target audio data corresponding to the control strategy of the camera assembly based on the positional relationships.

10. A processing device comprising:
a processor; and
a memory storing instructions that, when executed by the processor, cause the processor to:
control a first camera and a second camera of a camera assembly to collect image data based on a target strategy, the image data including first image data collected by the first camera and second image data collected by the second camera, and controlling the first camera and the second camera of the camera assembly to collect the image data based on the target strategy including:
obtaining the first image data collected by the first camera; and
obtaining the second image data collected by the second camera in response to the first image data not meeting an output requirement; and
process the first image data and the second image data to obtain target image data, including:
processing the first image data using the second image data to obtain the target image data;
wherein a configuration parameter of the first camera and a configuration parameter of the second camera are different from each other.

11. The processing device of claim 10, wherein the instructions further cause the processor to obtain the second image data in response to the first image data not meeting the output requirement by determining the second camera from the camera assembly to collect the second image data through the second camera in response to at least one of:
an image parameter of the first image data not meeting a target output parameter;
an image content of the first image data not including a target object; or
obtaining an instruction for adjusting at least one of the image parameter or the image content of the first image data.

12. The processing device of claim 11, wherein the instructions further cause the processor to determine the second camera from the camera assembly to collect the second image data through the second camera by at least one of:
obtaining a configuration parameter of each camera of the camera assembly, determining the second camera with a target configuration parameter from the camera assembly based on the configuration parameter of each camera, and collecting the second image data that at least partially meets the target output parameter and/or at least includes the target object;
obtaining change information of a spatial environment where the camera assembly is located, determining the second camera that matches the change information from the camera assembly, and collecting the second image data that includes the change information; or
obtaining a target output requirement, determining the second camera from the camera assembly based on the target output requirement, and collecting the second image data that at least partially meets the target output requirement.

13. The processing device of claim 10, wherein the instructions further cause the processor to control the first camera and the second camera of the camera assembly to collect the image data based on the target strategy by at least one of:
obtaining a purpose of the target image data, and controlling the first camera and the second camera of the camera assembly to collect the image data synchronously or asynchronously based on the purpose;
determining a spatial environment where the camera assembly is located, and controlling the first camera and the second camera of the camera assembly to collect the image data synchronously or asynchronously based on at least one of the spatial environment or change information of the spatial environment; or
obtaining operation information of an electronic device, and controlling the first camera and the second camera of the camera assembly to collect the image data synchronously or asynchronously based on the operation information.

14. The processing device of claim 13, wherein the instructions further cause the processor to control the first camera and the second camera of the camera assembly to collect the image data synchronously or asynchronously based on the change information of the spatial environment by at least one of:
in response to the change information indicating that an object is in a changing state, controlling the first camera and the second camera to collect the image data synchronously; or
in response to the change information indicating that the object changes from a first state to a second state, controlling the first camera and the second camera to collect the image data asynchronously.

15. The processing device of claim 13, wherein the instructions further cause the processor to control the first camera and the second camera of the camera assembly to collect the image data synchronously or asynchronously based on the operation information by at least one of:
in response to the electronic device running a first application and/or entering a first operation mode, controlling the first camera and the second camera to collect the image data synchronously; or
in response to the electronic device running a second application and/or entering a second operation mode, controlling the first camera and the second camera to collect the image data asynchronously.

16. The processing device of claim 13, wherein:
in response to a first collection area of the first camera partially overlapping with a second collection area of the second camera:
the first camera is controlled to adjust the first collection area or the second camera is controlled to adjust the second collection area, based on the configuration parameter of the first camera and the configuration parameter of the second camera, or the first image data or the second image data in an overlapping area is deleted based on the configuration parameter of the first camera and the configuration parameter of the second camera; or
in response to a collection blind spot existing between the first collection area and the second collection area:
the first camera is controlled to adjust the first collection area or the second camera is controlled to adjust the second collection area, based on the configuration parameter of the first camera and the configuration parameter of the second camera, or
the first image data and the second image data are processed to obtain image data corresponding to the collection blind spot.

17. The processing device of claim 10, wherein the instructions further cause the processor to process the first image data and the second image data to obtain the target image data by at least one of:
determining a target output requirement, and performing a first processing on the first image data and the second image data based on the target output requirement to obtain the target image data;
determining an association relationship between the first image data and the second image data, and performing a second processing on the first image data and the second image data based on the association relationship to obtain the target image data; or
obtaining audio data in a spatial environment where the camera assembly is located, and performing a third processing on the first image data and the second image data based on the audio data to obtain the target image data or to obtain target video data including the target image data.

18. The processing device of claim 10, wherein the instructions further cause the processor to:
control an audio collection assembly arranged at the camera assembly and/or an electronic device based on the target strategy to collect target audio data, and process the target audio data together with the target image data into target video data; or
obtain positional relationships between various audio collection members of the audio collection assembly and various cameras of the camera assembly, and control the audio collection assembly to collect the target audio data corresponding to the control strategy of the camera assembly based on the positional relationships.

19. A processing method comprising:
controlling a first camera and a second camera of a camera assembly to collect image data based on a target strategy, the image data including first image data collected by the first camera and second image data collected by the second camera; and
processing the first image data and the second image data to obtain target image data, including at least one of:
determining a target output requirement, and performing a first processing on the first image data and the second image data based on the target output requirement to obtain the target image data;
determining an association relationship between the first image data and the second image data, and performing a second processing on the first image data and the second image data based on the association relationship to obtain the target image data; or
obtaining audio data in a spatial environment where the camera assembly is located, and performing a third processing on the first image data and the second image data based on the audio data to obtain the target image data or to obtain target video data including the target image data;
wherein a configuration parameter of the first camera and a configuration parameter of the second camera are different from each other.

\* \* \* \* \*